(12) United States Patent
Hall et al.

(10) Patent No.: US 11,972,392 B2
(45) Date of Patent: Apr. 30, 2024

(54) LOCATION TRACKING SYSTEM

(71) Applicant: Hall Labs LLC, Provo, UT (US)

(72) Inventors: David R. Hall, Provo, UT (US); Jared Eggett, Lehi, UT (US); David Brent Noel, Orem, UT (US)

(73) Assignee: Hall Labs LLC, Provo, UT (US)

( * ) Notice: Subject to any disclaimer, the term of this patent is extended or adjusted under 35 U.S.C. 154(b) by 656 days.

(21) Appl. No.: 17/146,419

(22) Filed: Jan. 11, 2021

(65) Prior Publication Data

US 2022/0222611 A1  Jul. 14, 2022

(51) Int. Cl.
| | |
|---|---|
| *G06Q 10/087* | (2023.01) |
| *G06F 16/13* | (2019.01) |
| *G06F 16/22* | (2019.01) |
| *G09F 3/20* | (2006.01) |
| *G06F 21/64* | (2013.01) |

(52) U.S. Cl.
CPC ......... *G06Q 10/087* (2013.01); *G06F 16/137* (2019.01); *G06F 16/2255* (2019.01); *G09F 3/204* (2013.01)

(58) Field of Classification Search
CPC . G06Q 10/087; G06F 16/137; G06F 16/2255; G06F 16/9035; G09F 3/204

USPC .............................................................. 705/28
See application file for complete search history.

(56) References Cited

U.S. PATENT DOCUMENTS

| | | | | |
|---|---|---|---|---|
| 7,347,292 | B1* | 3/2008 | Hall | E21C 35/183 |
| | | | | 175/425 |
| 11,681,980 | B2* | 6/2023 | Yamin | G06Q 10/087 |
| | | | | 382/103 |
| 2018/0173917 | A1* | 6/2018 | Endress | G09C 1/00 |
| 2020/0164886 | A1* | 5/2020 | Dutta | G06F 21/64 |
| 2020/0266984 | A1* | 8/2020 | Endress | H04L 9/0643 |
| 2021/0272037 | A1* | 9/2021 | Hanebeck | H04W 4/35 |

* cited by examiner

*Primary Examiner* — Garcia Ade (57) ABSTRACT

Systems, devices, and methods for locating an item within an enclosure is described. The method includes affixing a first-tier label to a fixture within the enclosure, identifying a first location of the first-tier label based on at least three distance measurements between the first-tier label and a respective plane of the three orthogonal planar surfaces, identifying a second-tier label in proximity to the first-tier label, wherein the second-tier label is associated with an item, determining a first relative position of the second-tier label with respect to the first location of the first-tier label, and determining a second location of the second-tier label based on the first relative position with respect to the first location and the first location.

18 Claims, 4 Drawing Sheets

LOCATION TRACKING SYSTEM

CROSS-REFERENCE TO RELATED APPLICATIONS

The present application for patent claims priority to U.S. Provisional Application No. 62/959,341, filed Jan. 10, 2020, which is assigned to the assignee of the present application and hereby expressly incorporated by reference

TECHNICAL FIELD

The described systems, devices, and methods are directed to tracking the locations of items.

BACKGROUND

Warehouses have traditionally stored items together with like items. This makes it easy for a certain item to be located as all instances of that item are stored in a singular area or location. One of the challenges of the is approach is that it can be inefficient, both in terms of time efficiency and space efficiency to have the constraint that all like items are stored in a singular location. Warehousing efficiency may be improved by placing items in an available location (such that items are spread out in multiple different locations). However, this approach makes picking/retrieving items difficult for persons. The introduction of machine algorithms for keeping track of items has helped, but improvements are needed to ensure that specific items can be located near instantly with exact precision.

SUMMARY

In a first aspect, the disclosure describes a method for locating an item within an enclosure. The method includes affixing a first-tier label to a fixture within the enclosure, wherein the enclosure is associated with three orthogonal planar surfaces; identifying a first location of the first-tier label based on at least three distance measurements between the first-tier label and a respective plane of the three orthogonal planar surfaces; identifying a second-tier label in proximity to the first-tier label, wherein the second-tier label is associated with an item; determining a first relative position of the second-tier label with respect to the first location of the first-tier label; and determining a second location of the second-tier label based on the first relative position with respect to the first location and the first location.

In a second aspect, the disclosure provides that the first-tier label and the second-tier label are of known dimensions so that the first relative position may be determined with respect to the three orthogonal planar surfaces.

In a third aspect, the disclosure provides that the method further includes obtaining a first image that depicts the first-tier label and the second-tier label, wherein the first relative position is determined based on the known dimensions of first-tier label and the second-tier label and the depiction of the first-tier label and the second-tier label in the first image.

In a fourth aspect, the disclosure provides that the method further includes adding a first block to a first blockchain associated with the first-tier label, wherein the first block includes the first location; and adding a second block to a second blockchain associated with the second-tier label, wherein the second block includes the second location and a reference to the first block.

In a fifth aspect, the disclosure provides that the method further includes receiving a request to locate the second item; identifying the second block in the second blockchain, wherein the second block includes the second location; and providing the second location in response to the request.

In a sixth aspect, the disclosure provides that the method further includes obtaining a second image that depicts the second-tier label and a third-tier label, wherein the third-tier label is associated with a third item; determining a second relative position of the third-tier label with respect to the second location of the second-tier label based on the known dimensions of the second-tier label and the third-tier label and the depiction of the second-tier label and the third-tier label in the second image; determining a third location of the third-tier label based on the second relative position with respect to the second location and the second location; and adding a third block to a third blockchain associated with the third-tier label, wherein the third block includes the third location and a reference to the second block.

In a seventh aspect, the disclosure provides that the method further includes obtaining a third image that depicts the first-tier label and the second-tier label; determining a third relative position of the second-tier label with respect to the first location of the first-tier label based on the known dimensions of first-tier label and the second-tier label and the depiction of the first-tier label and the second-tier label in the third image; and determining that the third relative position is different than the first relative position.

In an eighth aspect, the disclosure provides that the method further includes determining a fourth location of the second-tier label based on the third relative position with respect to the second location and the second location; and adding a fourth block to the second blockchain associated with the second-tier label, wherein the fourth block includes the fourth location and a reference to the first block.

In a ninth aspect, the disclosure provides that the three orthogonal planar surfaces correspond with the two walls of the enclosure and a floor of the enclosure.

In a tenth aspect, the disclosure provides that the fixture is affixed to the floor of the enclosure.

In an eleventh aspect, a device for locating an item in an enclosure is described. The device includes a processor; memory in electronic communication with the processor; and instructions stored in the memory that when executed by the processor cause the processor to: identify a first-tier label that is affixed to a fixture within the enclosure, wherein the enclosure is associated with three orthogonal planar surfaces; identify a first location of the first-tier label based on at least three distance measurements between the first-tier label and a respective plane of the three orthogonal planar surfaces; identify a second-tier label in proximity to the first-tier label, wherein the second-tier label is associated with an item; determine a first relative position of the second-tier label with respect to the first location of the first-tier label; and determine a second location of the second-tier label based on the first relative position with respect to the first location and the first location.

In a twelfth aspect, the disclosure provides that the first-tier label and the second-tier label are of known dimensions so that the first relative position may be determined with respect to the three orthogonal planar surfaces.

In a thirteenth aspect, the disclosure provides that the instructions are further executable by the processor to: obtain a first image that depicts the first-tier label and the second-tier label, wherein the first relative position is determined based on the known dimensions of first-tier label and the second-tier label and the depiction of the first-tier label and the second-tier label in the first image.

In a fourteenth aspect, the disclosure provides that the instructions are further executable by the processor to: add a first block to a first blockchain associated with the first-tier label, wherein the first block includes the first location; and add a second block to a second blockchain associated with the second-tier label, wherein the second block includes the second location and a reference to the first block.

In a fifteenth aspect, the disclosure provides that the instructions are further executable by the processor to: receive a request to locate the second item; identify the second block in the second blockchain, wherein the second block includes the second location; and provide the second location in response to the request.

In a sixteenth aspect, the disclosure provides that the instructions are further executable by the processor to: obtain a second image that depicts the second-tier label and a third-tier label, wherein the third-tier label is associated with a third item; determine a second relative position of the third-tier label with respect to the second location of the second-tier label based on the known dimensions of the second-tier label and the third-tier label and the depiction of the second-tier label and the third-tier label in the second image; determine a third location of the third-tier label based on the second relative position with respect to the second location and the second location; and add a third block to a third blockchain associated with the third-tier label, wherein the third block includes the third location and a reference to the second block.

In a seventeenth aspect, the disclosure provides that the instructions are further executable by the processor to: obtain a third image that depicts the first-tier label and the second-tier label; determine a third relative position of the second-tier label with respect to the first location of the first-tier label based on the known dimensions of first-tier label and the second-tier label and the depiction of the first-tier label and the second-tier label in the third image; and determine that the third relative position is different than the first relative position.

In an eighteenth aspect, the disclosure provides that the instructions are further executable by the processor to: determine a fourth location of the second-tier label based on the third relative position with respect to the second location and the second location; and add a fourth block to the second blockchain associated with the second-tier label, wherein the fourth block includes the fourth location and a reference to the first block.

In a nineteenth aspect, the disclosure provides that the three orthogonal planar surfaces correspond with the two walls of the enclosure and a floor of the enclosure.

In a twentieth aspect, the disclosure provides that the fixture is affixed to the floor of the enclosure.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed systems, devices, and methods described herein and are not intended to show every potential feature or embodiment of the claimed systems, devices, and methods. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the described systems, devices, and methods disclosed herein. No particular embodiment is intended to define the scope of the described systems, devices, and methods. Rather, the embodiments provide non-limiting examples of various compositions, and methods that are included within the scope of the claimed systems, devices, and methods. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As noted above, picking items in a randomly organized storage system (e.g., warehouse) may be particularly challenging because instead of locating a singular area that includes multiple items of the same time, a single item must be located intermixed between different types of other items. Such an arrangement may be difficult for humans, who must manually search to identify a particular item among a randomized assortment of other items. Accordingly, there is a need to enable precise item locations of items within a building.

Location determination within a building is typically challenging. Traditional location determination systems such as global positioning system (GPS) and global navigation satellite system (GLONASS) which utilize radio frequency signals transmitted by satellites, are a good option for outdoor location determination where the satellite signals can be received without obstruction, but are not a good option within buildings, which obstruct and/or distort satellite signals making location determination unreliable at best and unavailable at worst. Furthermore, these traditional location determination systems lack the desired location determination precision for pinpoint (e.g., within a centimeter, a millimeter) accuracy (which is desired for accurate item picking from a particular shelf, for example). Accordingly, improved location determination systems are needed.

A location label (e.g., barcode, QR code, etc.), including a label, may be used to identify a location. Location labels are organized in a hierarchal manner with one or more labels in a first tier and one or more labels in a second tier. Each label in the first tier is defined with a specific location. For example, a laser distance finder may be used to determine a distance to a first wall, a distance to a second wall, and a height above a floor. It is appreciated that as long as the same first wall, same second wall, and same floor are used for distance determination for each label in the first tier, then all the first-tier labels will all be accurately located relatively to each other. A first-tier label defines a specific location within the building. This specific location is used by all the lower tier labels that rely on that location. The location of a second-tier label is defined based on a relative distance to a first-tier label (e.g., that has a specific location, known location). For example, given that the size of a first-tier label is known and that the size of the second-tier label is known, then the relative location of the second-tier label can be precisely determined with respect to the first-tier label. Accordingly, the location of the second-tier label within the building is determined based on the known location of the first-tier label and the relative location of the second-tier label with respect to the first-tier label. Like a second-tier label, all subsequent tier labels have a location within the building that is determined based on a relative location to a label in the previous tier.

By having only the first-tier labels being defined with a specific location (i.e., the first-tier labels need to be fixed with respect to the building). All lower tier labels may be moved and or adjusted because their location is relative (eventually, depending on what tier they are at, for example) to a first-tier specific location.

Relative location determination may be determined and/or updated based on an image (e.g., camera image) that includes a label with a determined location and another label. The labels, such as a QR code, may provide scale which in combination with a difference between the two labels allows for precisely determining a relative location the other label.

Using location labels may enable precise identification of location for picking items or locating an item. In some embodiments, a box or bin on a shelf may include a location label for precisely identifying the location of the box or bin. In some embodiments, location labels may include additional information, including attributes of an item, etc., so as to serve multiple purposes (e.g., in terms of providing information (e.g., a blockchain) about an item as well as including location information for the item (which may be included as an additional attribute in the blockchain, for example).

In one example, a warehouse may include a first-tier location label may defined and placed at one end of a shelving area. Each of the shelves may include a second-tier label that has a relative location with respect to the first-tier label. The shelves may include boxes and/or bins that each include a third-tier label that have a relative location with respect to the second-tier label. A camera may be use to capture images which may be run through an algorithm to determine relative locations (and by relation, actual locations) based on one or more images. Each label may be associated with an item (e.g., a shelf, a box, a bin, a product, a location) with an associated blockchain that stores information pertaining to the item.

Cameras may be mounted in fixed locations or may be attached to a moveable object (e.g., a user, a robot, a forklift, a drone, etc.) that continuously captures images and provides consistent updates based on all the labels that are captured in the images. In one example, a camera may be part of a virtual reality glasses apparatus. Accordingly, items can be located (and/or have locations updated) by users and/or a forklift simply moving through the space.

A location can be an item and have a unique blockchain or may be an attribute of an item and be listed and/or updated in a blockchain associated with that item.

The described features herein may be used in combination with digital displays, such as virtual/augmented/mixed reality glasses, to improve and enhance workflows. As noted above, virtual/augmented/mixed reality glasses may be equipped with one or more cameras that provide images that can be analyzed to monitor items, monitor locations, update locations, etc. In some embodiments the virtual reality system may use the cameras and the resulting information that comes from a viewed label to enhance or augment a job.

For example, a person with the responsibility of picking items from a warehouse may put on virtual/augmented/mixed reality glasses and be guided via visual cues in the virtual reality display (in combination with reality in an augmented/mixed reality scenario, for example) to a desired item based on the location information provided by the location labels (e.g., labels that include location information). For example, the virtual/augmented/mixed reality glasses may provide a highlighted pathway to follow an optimized path and may highlight the exact bin/box that should be targeted using display cues that are determined based on one or more labels.

It is appreciated, that each item is associated with a unique code or label that is specific to at least all instances of such item. In some embodiment, the unique code or label is globally unique for each instance of an item. In such cases, the unique code or label may provide a consistent identifier that enables a single unified tracking system (e.g., transparency of an item's lifetime) with accessible (e.g., public) records that enable different entities to access the records. In some embodiments, the accessible records may be blocks in a chain of blocks that uses blockchain technology (each block includes a hash of the block and a hash the previous block, for example). The accessible records may be decentralized and distributed requiring consensus to ensure data security. In some cases, blocks are cryptographically secure to ensure only authorized users can access the data. Because blockchain ensures data is not tampered with, a permanent record may be easily maintained using blockchain technology.

In one example a new blockchain is established for each unique item. An item may be a physical item (e.g., a raw material, a component, a finished good, a piece of equipment, a fixture), a person (e.g., an individual, a worker, a technician), a document (e.g., a contract, an invoice, an email, an instruction), and the like.

At the point at which the unified tracking system is used, the item block (e.g., genesis block, first block in the chain of blocks) is created. Thereafter the item is tracked with each interaction being added as a new block in the block chain. Accordingly, the block chain captures a transparency of an item's lifetime (experience of events, actions, interactions (e.g., with processes and/or people), assembly, sourcing, destination, packaging, transportation, locations, quality tests, repairs, usage, etc., for example)

For example, a pallet of a raw material may be received from a first entity (that does not utilize the unified tracking system, for example). At the unloading dock, the pallet may be affixed with a first label (e.g., a barcode, matrix barcode, Quick Response (QR) code, radio frequency identification (RFID), or the like) and scanned into the unified tracking system. A new block chain is created for the first label (representing the pallet), with the first block identifying what the item is (i.e., a pallet of the raw material) and a first action (e.g., received by the entity at a particular facility). In some embodiments, a jack that is used to move the pallet may weigh the pallet to provide an initial weight of the pallet. In some embodiments, a camera or camera system (or lidar system, for example) may be used to identify an initial physical size of the pallet. These additional parameters may be included in the first block or in a subsequent block in the chain (depending on implementation and/or timing of when each action (e.g., receipt, weighing, identifying dimension, etc.) occurs). The weight and/or dimension of the pallet may be used to identify the quantity of raw material in the pallet. These measurements may be used in combination to help detect alterations or tampering with the pallet.

Continuing with this example, at some point at least a portion of the pallet may be opened/disassembled. Regardless of how the pallet is broken up (e.g., in individual boxes of one, in smaller quantities (e.g., 12), or larger boxes that each contain smaller boxes, with individual boxes inside the smaller boxes), each disparate item is labeled with a unique label associated with a unique block chain, as discussed with respect to the first label. Each unique blockchain includes a reference to the blockchain associated with the pallet. In addition, the blockchain associated with the pallet may be updated (in one or more subsequent blocks, for example) with a reference to the action of removing of an item from the pallet, a reference to the person (e.g., worker) or persons who is doing the removing, and a listing of each unique label for each disparate item. In this way, each interaction is permanently tracked in a simple manner that allows easy tracking of each step/interaction along the way for each item.

It is appreciated that the tracking system creates lots of different block chains (e.g., one for each item). For example, a block chain for the pallet may contain information about the pallet, equipment or fixtures that have interacted with the pallet, persons that have interacted with the pallet, actions that have been performed on the pallet, etc. Each of these, in turn, may have their own block chains that track information, interactions, and the like. For example, the person that breaks a part the pallet may be identified with the action of breaking a part the pallet. In this case, a box may be added to each of the involved items to the interaction/transaction. For example, a block may be added to the blockchain for the pallet (indicating the action of breaking apart, the person(s) doing the breaking, and the resulting labels of the subparts, for example), a block (e.g., the genesis block, first block) may be added to the blockchain for the disparate item (indicating the action of being unloaded from the pallet with a reference to the pallet, the person doing the unloading, the location of the action, etc., for example), a block may be added to the blockchain for the person (indicating the action was performed by the person, when the action was performed, how many of those actions the blockchain was formed, for example), and a block may be added to the action indicating that the action was done, when the action was done, and by whom (e.g., the person) the action was done.

Each label may contain a reference to the particular blockchain associated with the item that the label is on. In addition, the each label may contain additional information associated with the item. For example, the label on the pallet may include a reference to the blockchain as well as additional information, such as a quantity associated with the item, a location of the item, an owner of the item, and/or the like. Accordingly, in the case that only a portion of the pallet was removed from the pallet, then the pallet may be rewrapped, and a second label may be added to the pallet to replace the first label. In some embodiments, the second label may identify the same block chain for the pallet along with new information identifying the new quantity of raw material in the pallet (along with weight and/or dimension information, for example). In another embodiment, a new blockchain may be created for the partial pallet with a reference to the blockchain for the pallet associated with the first label. In either case, the unified tracking system enables detailed tracking (e.g., transparency of the item's lifetime) that encompasses data about the item, data about what fixtures/equipment the item went through, data about the persons that interacted with the item, and data about the actions/activity that the item went through. In some embodiments, a location can be an item and have a unique blockchain or may be an attribute of an item and be listed and/or updated in a blockchain associated with that item. Furthermore, the data from the unified tracking system may be accessible by all entities in a supply chain or potentially anyone who has any interested in seeing it.

It is appreciated that the permanent record allows simple references between blocks in the same or different blockchains to identify relationships, interactions, or connections. For example, group/subgroup relationships can easily have multiple layers with each level documented by references to upper level and lower-level relationships (via references (e.g., parent/child) to related blocks, for example).

Blockchains have nearly unlimited capacity (depending on the size of the addressing system of blocks, for example). Accordingly, the blockchain may include blocks that contain and/or track all kinds of information and/or attributes. These attributes include an item identifier (ID) (e.g., asset ID, for asset tagging purposes), a responsible party for the item, depreciation information (e.g., for accounting purposes), natural aging attributes (e.g., expiration dates, sell by dates, etc.), sales data, transaction data, weight, size/dimensions, actions performed on, timestamps of actions and or events, location, quality control information and testing information, sourcing information, and the like.

As noted herein, the blockchain may be accessible to multiple entities (may be public or restricted to those with access, for example) and may be used by multiple entities as items are transferred between and in custody of different entities. Accordingly, the detailed history and experience of each item may be precisely tracked. It is appreciated that this information may be used to improve inventory/warehouse management while reducing shrinkage.

Due to human limitations, items (e.g., boxes and pallets) are typically limited to a single item type. The unified tracking system easily maintains detailed records of each item within a pallet or a box, allowing for mixed bundles of items.

In one example, a top (first) level item (e.g., a pallet) may have a first label, each of a number of boxes within the pallet may each have a second level unique second label (regardless of whether the boxes include the same item or a mixed bundle of items, each box is uniquely identified and tracked, for example). Each box may include sub boxes which may each have a third level unique third label (regardless of whether the sub boxes include the same item or a mixed bundle of items, each sub box is uniquely identified and tracked, for example). It is appreciated that each item (e.g., pallet, boxes, and sub boxes) may each be recognized as a unique item (as well as the items in the sub boxes, for example) and may have a unique blockchain associated with the item.

As there is a hierarchy of items, each item may include in its block chain its relationship to both top level and bottom level items (e.g., the blockchain for the pallet may identify each relationship in the hierarchy, including the second labels of each box included in the pallet as well the third labels of each sub box contained within their respective boxes (and the items within the respective sub boxes, for example). Similarly, each item (each box, sub box, and item, and additional layers as needed, for example) may include similar relationship records in their respective blockchains. Thus, a lowest label item can trace relationships all the way to a specific pallet (and higher, for example). Similarly, the top-level item (e.g., the pallet) can trace relationship all the way down to each specific lowest label item. Accordingly, relationships and tracking are uniquely maintained in the unified tracking system. It is appreciated that the blockchain and multi entity availability of the unified tracking system allows entities to leverage prior information and data to enhance metrics associated with each item and draw observations and conclusions based on the available big data. This relationship between items, similarly applies to the relationship between different tiered location items.

Figure 1:
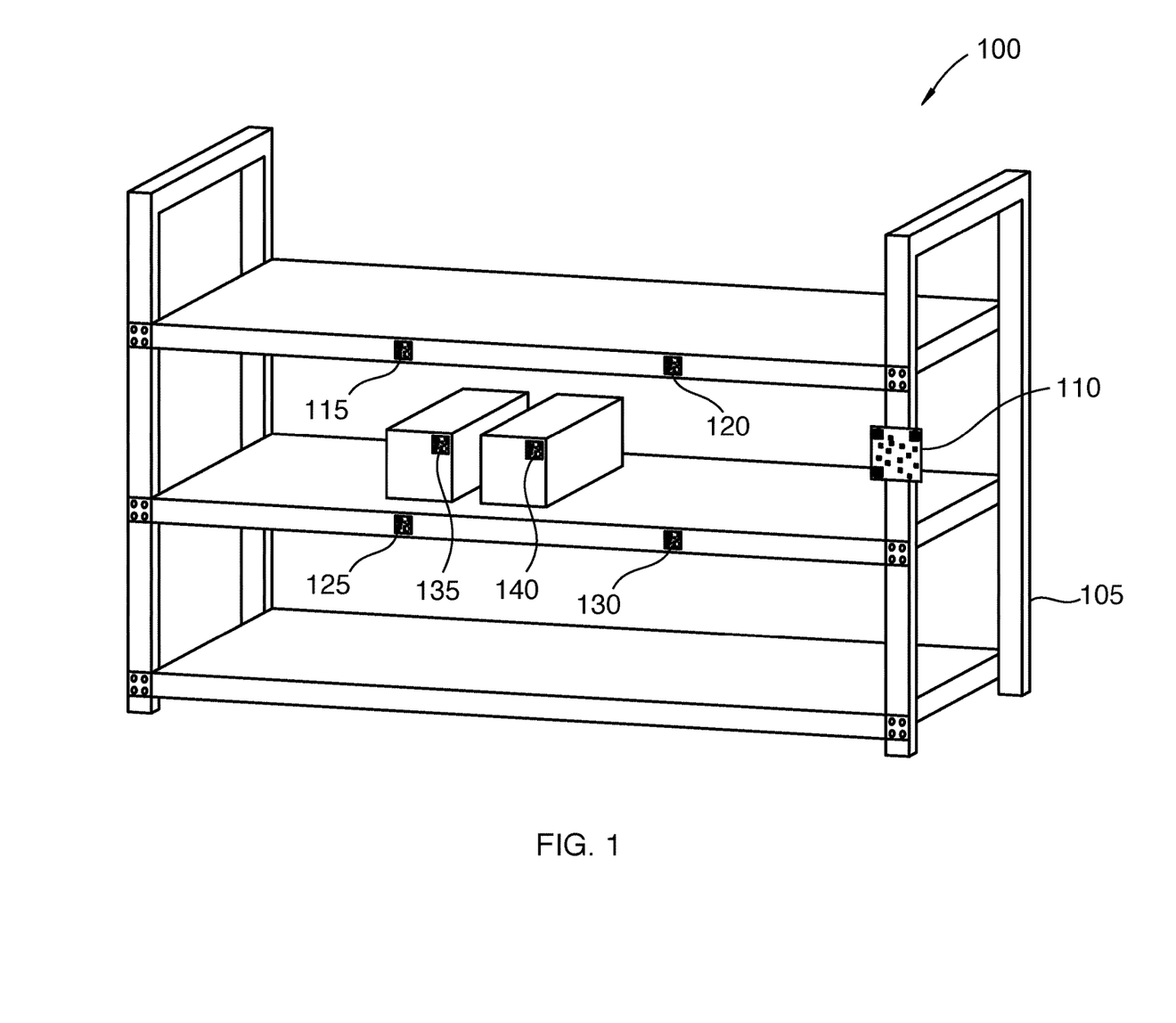
FIG. 1 is a perspective diagram illustrating an embodiment in which the described systems and methods may be used.

Turning now to the figures, FIG. 1 is a perspective diagram illustrating an embodiment of the described systems and methods. A shelf 105 may be affixed to a building (bolted to the floor, for example). A first label 110 is affixed to the shelf 105. The location of the first label 110 may be determined with reference to the building. For example, the location of the first label 110 may be determined by measuring a distance between the first label 110 and each of a first wall of the building, a second wall of the building, and the floor of the building to arrive at a 3D point in space with reference to the building (e.g., 130 feet from the first wall (e.g., north wall) of the building, 26.5 feet from the second wall (e.g., east wall) of the building, and 4.18 feet from the floor of the building).

One or more additional labels (e.g., 115, 120, 125, 130) may be affixed to the shelf 105. The location of each of these additional labels are determined with respect to and based on the known location of the first label 110. Due to the nature of the first label 110 being of a known size (e.g., having known dimensions), the first label 110 itself provides scale for determining locations in proximity to the first label 110. Based on a single image that includes the first label 110 and an additional label, the location of the additional label may be determined. For instance, based on the image that includes the first label 110 and additional label 115, an algorithm may determine (based on the size/scale provided by the first label 110, for example) the relative distances (in all viewable directions, for example) between the first label 110 and the additional label 115 (0.001 feet further north, 5.1 feet further east, and 0.9 feet higher from the floor than the first label 110. Based on this relative information, the algorithm determines that the location of the additional label is 129.999 feet from the first wall, 21.4 feet from the second wall, and 5.08 feet above the floor. Thus, the location of all additional labels in the second tier are based on a relative distance to the first label 110.

The shelf 105 includes 2 boxes, each of which including a label (e.g., 135, 140). The box labels may be in a third (or lower tier), which may determine location based on the tier immediately above as described herein. In this case, the location of the additional label 125 is known (based on reference to the first label 110, for example) and the relative distance/relationship between the additional label 125 and the box label 135 is determined based on the known size/dimensions of the additional label 125 and the box label 135 and the spatial relationship between the additional label 125 and the box label 135. Based on this spatial relationship, as discussed above, the algorithm determines the relative distance, from which the specific location in the building may be determined as discussed herein.

In this way, items may easily be located based on a relationship or series of relationships with lead back to a fixed location (e.g., the first label 110, with the location that is explicitly measured (using laser distance finders, for example). Because of the use of references, boxes may come and go, may be moved forward and back and/or left or right—with the updated location being easily discernable.

Figure 2:
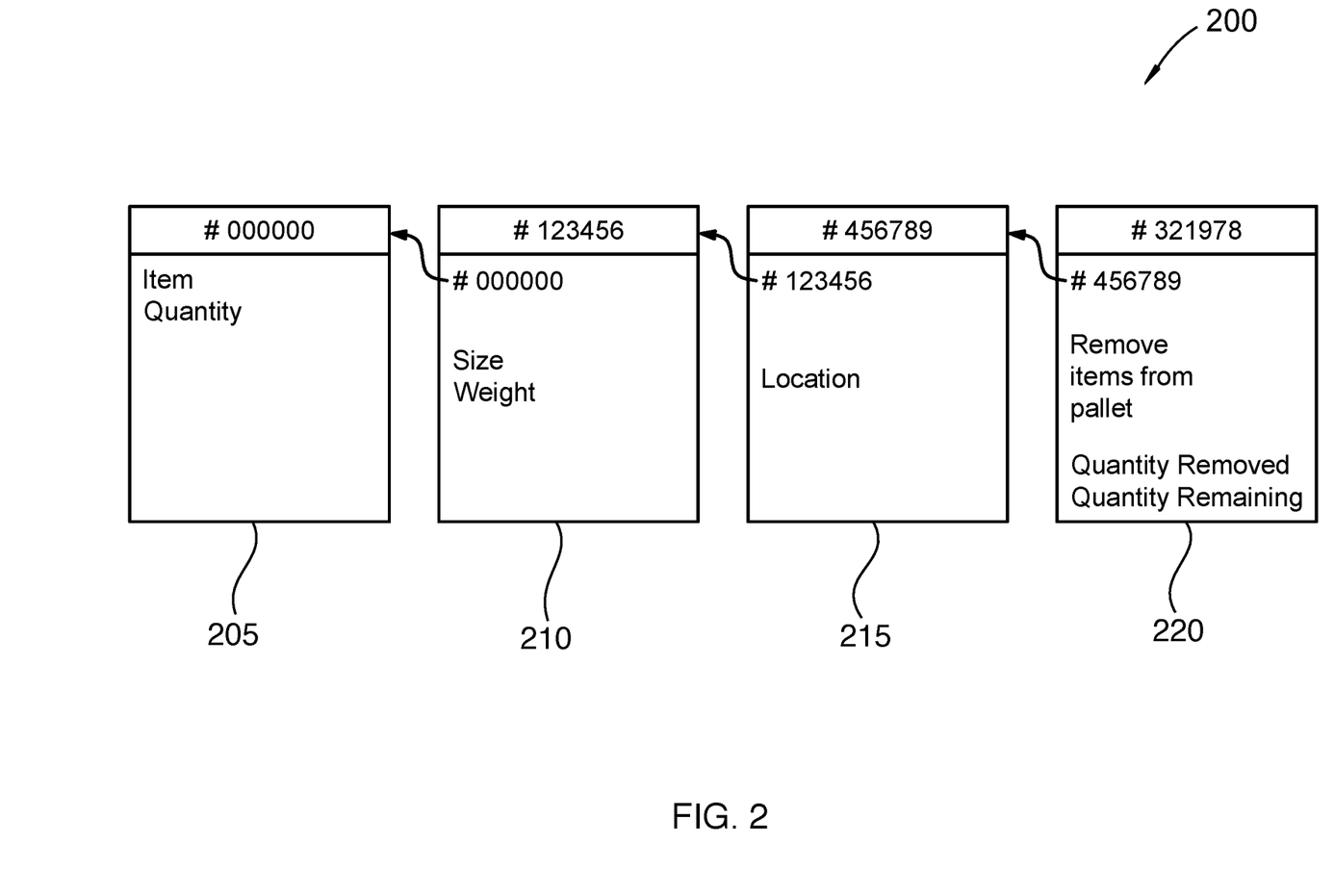
FIG. 2 is a block diagram illustrating a blockchain that may be used in the described systems and methods.

FIG. 2 is a block diagram illustrating a blockchain 200 that may be used in the described systems and methods. The blockchain includes a first block 205, a second block 210, a third block 215, and a fourth block 220. While only four blocks are illustrated, it is appreciated that each blockchain may have a nearly unlimited number of subsequent blocks in the chain.

The blockchain begins with a first (e.g., genesis) block 205 that includes a start identifier (e.g., #000000). The first block 205 does not follow another block but is itself the start of a new block chain. In one example, the first block 205 identifies the item that it is about. In some cases, as in the case of a pallet that includes sub items, the first block (or a subsequent block) may have a quantity value of sub items.

The second block 210 has a second identifier (e.g., #123456) and a reference to the prior block (e.g., the first block #0000000). In one example, the second block 210 include a size/shape/dimensions value and a weight value. For example, the weight of the item may be determined as the item is lifted by a pallet lift (e.g., forklift) and the size/shape/dimensions of the item may be determined by an algorithm (e.g., 3D modeling algorithm) based on images from a camera as the item is moved by the pallet lift. Accordingly, the size/shape/dimensions and weight may be determined at approximately the same time such that both values may be included in the same block (e.g., second block 210).

The third block 215 has a third identifier (e.g., #456789) and a reference to the prior block (e.g., the second block #123456). In one example, the third block 215 includes a location of the item. In some cases, the location may be determined based on the spatial relationship between a label of the item and a location label (e.g., label 125) as described with respect to FIG. 1.

The fourth block 220 has a fourth identifier (e.g., #321978) and a reference to the prior block (e.g., the third block #456789). In one example, the fourth block 220 includes an action that occurred on the item (e.g., remove subitems from an item, remove items from the pallet, for example). In addition to including the action, the fourth block 220 may identify the quantity removed from the item and/or the quantity remaining with the item (based on the quantity included in the first block 205, for example).

It is appreciated that each block has an identifier, and each identifier is unique in the blockchain. The requirement of unique identifiers is necessary to ensure that proper chaining of the blocks. The blockchain provides transparency to all of the attributes and details that may be of interest (e.g., item details, quantity, size, weight, location, actions, interactions with persons, interactions with processes, status, milestones, shipping information, and the like.

Figure 3:
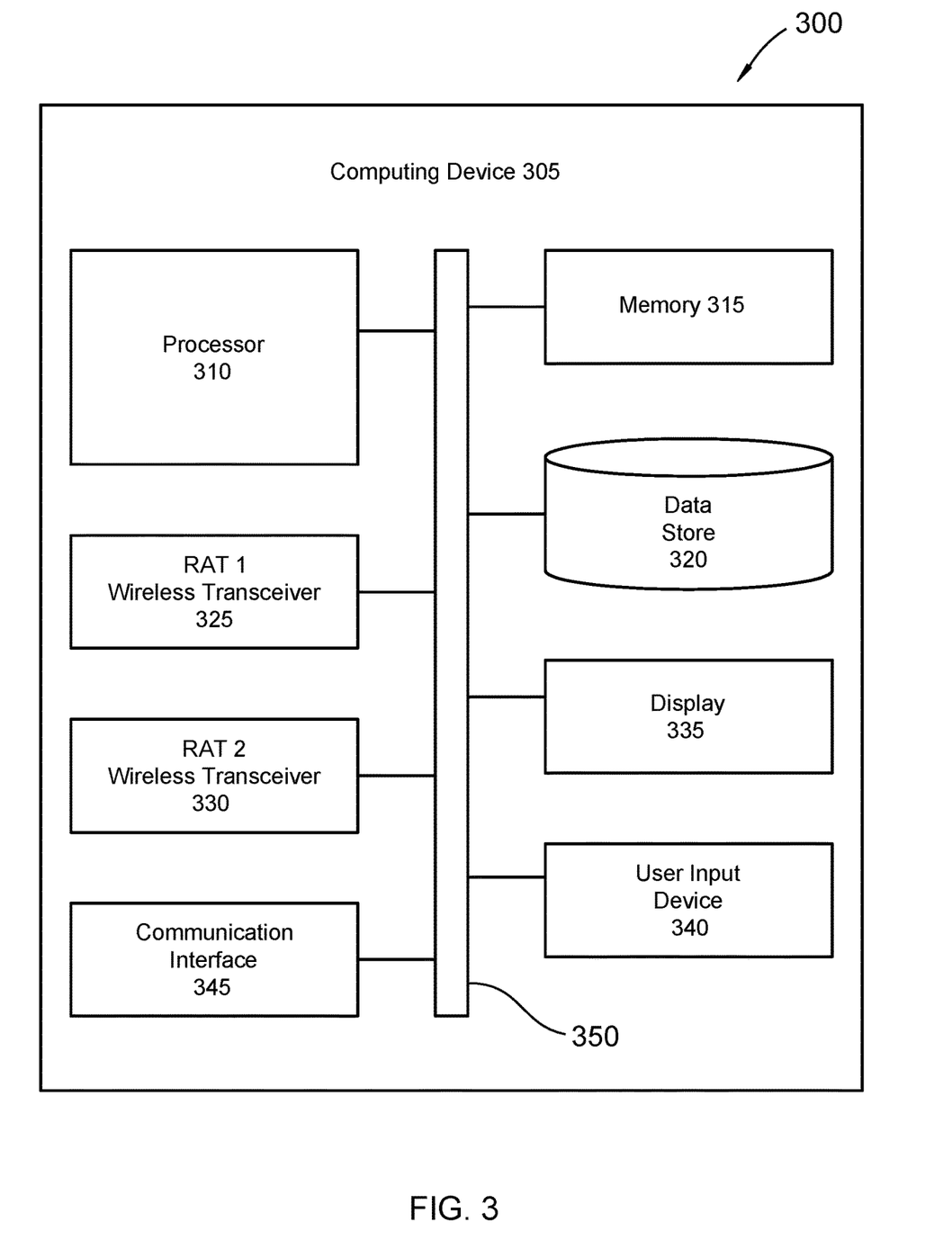
FIG. 3 is a block diagram of a computing device for implementing the described systems and methods.

FIG. 3 is a block diagram of a computing device 300 for implementing the described systems and methods. In some embodiments, the server described herein (that implements the unified tracking system and the various algorithms described herein, for example) may be examples of the computing device 305.

The computing device 305 includes a processor 310 (including a general-purpose processor and one or more application specific processors, for example), a wireless transceiver 325 for communicating via a first RAT (e.g., Wi-Fi, Bluetooth, 3G, 4G, LTE, 5G-NR, and/or Lora WAN), an optional wireless transceiver 330 for communicating via a second RAT (e.g., Bluetooth, Wi-Fi), a communication interface 345 (e.g., serial interface, peripheral component interconnect express), a memory 315 (e.g., random access memory (RAM), non-volatile RAM (NVRAM)), data store 320 (e.g., hard disk drive, solid state disk), an optional display 335 for interfacing with a user, a user input device 340 (e.g., touch input, mouse, keyboard, pen input), and an interconnect or bus 350 for interconnecting each of the components 310-e40.

In some embodiments, the memory 315 and/or the data store 320 (each being a non-transitory storage medium, for example) may store instructions that are executable by the processor 310 to implement the systems and methods described herein. For example, the instructions may be executable by the processor 310 to implement any of the methods (or algorithms) described herein.

Figure 4:
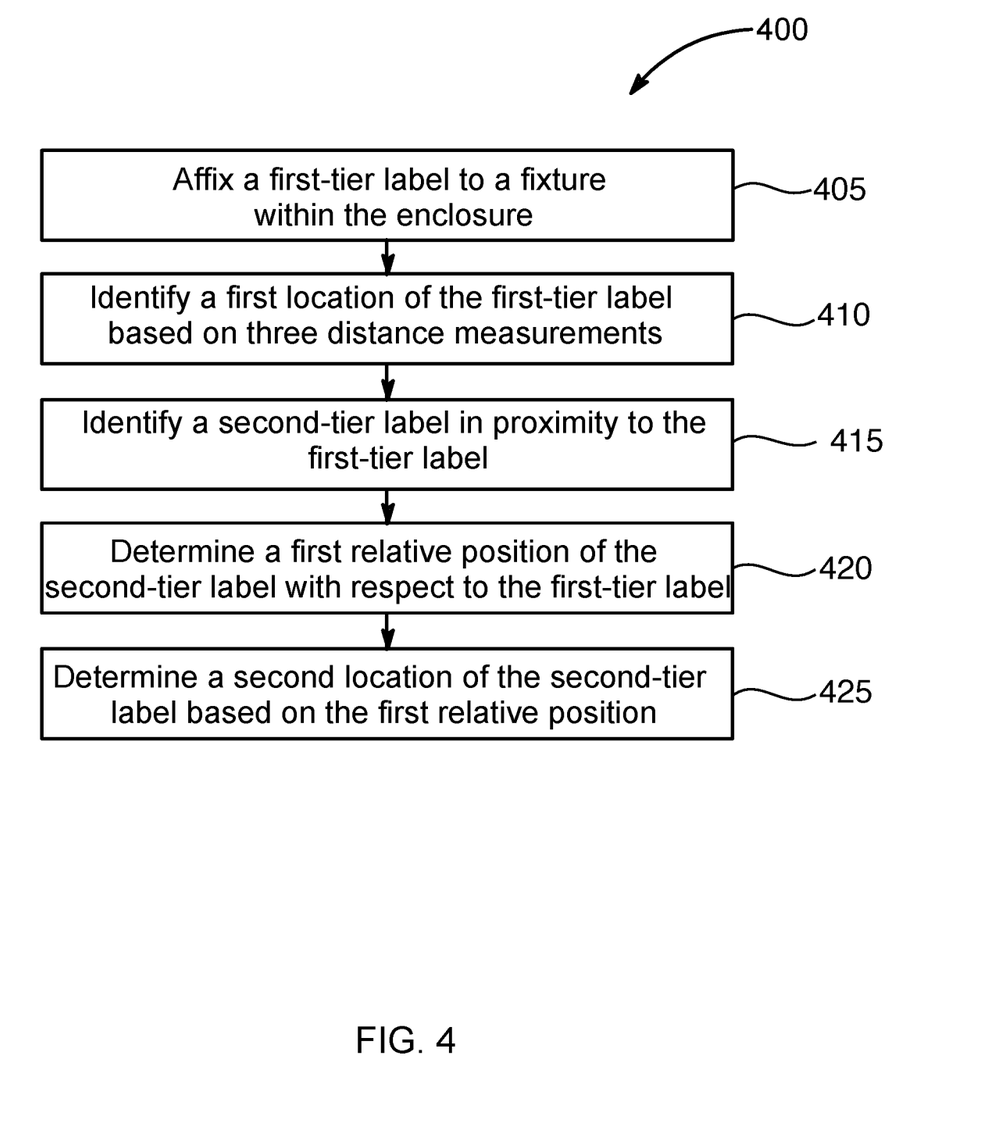
FIG. 4 is a flow diagram illustrating one example of a method for tracking an item.

FIG. 4 is a flow diagram illustrating one example of a method 400 for tracking an item. The method 400 may be implemented by a computing device 305 or an application specific processor (e.g., processor and memory) included within a device.

At 405, a first-tier label is affixed to a fixture within the enclosure. At 410, a first location of the first-tier label is identified based on three distance measures to three orthogonal planar surfaces associated with the enclosure. At 415, a second-tier label in proximity to the first-tier label is identified. At 420, a first relative position of the second-tier label is determined with respect to the first-tier label. At 425, a second location of the second-tier label is determined based on the first relative position and the first position.

The systems, methods, and devices herein have been described with reference to various specific and preferred embodiments and techniques. Nevertheless, it is understood that many variations and modifications may be made while remaining within the spirit and scope of the disclosure.

What is claimed is:

1. A method by a computing device for locating an item within an enclosure, comprising:
   obtaining by the computing device a first image that depicts a first-tier label and a second-tier label;
   identify the first-tier label in the first image, wherein the first-tier label is affixed to a fixture within the enclosure, wherein the enclosure is associated with three orthogonal planar surfaces, and wherein the first-tier label has a first size;
   determining by the computing device a first location of the first-tier label based on at least three distance measurements between the first-tier label and a respective plane of the three orthogonal planar surfaces;
   identifying the second-tier label in the first image, wherein the second-tier label is in proximity to the first-tier label, wherein the second-tier label is associated with the item, and wherein the second-tier label has a second size;
   determining by the computing device a first relative position of the second-tier label with respect to the first location of the first-tier label based on the first image, wherein the first relative position is determined based on the first size of the first-tier label, the second size of the second-tier label and the depiction of the first-tier label and the second-tier label in the first image; and
   determining by the computing device a second location of the second-tier label based on the first relative position with respect to the first location and the first location.

2. The method of claim 1, wherein the first size and the second size are of known dimensions so that the first relative position may be determined based on a special relationship between the first-tier label and the second-tier label depicted in the first image and scale provided by the first size and the second size.

3. The method of claim 2, further comprising:
   adding a first block to a first blockchain associated with the first-tier label, wherein the first block includes the first location; and
   adding a second block to a second blockchain associated with the second-tier label, wherein the second block includes the second location and a reference to the first block.

4. The method of claim 3, further comprising:
   receiving a request to locate the second item;
   identifying the second block in the second blockchain, wherein the second block includes the second location; and
   providing the second location in response to the request.

5. The method of claim 3, further comprising:
   obtaining a second image that depicts the second-tier label and a third-tier label, wherein the third-tier label is associated with a third item;
   determining a second relative position of the third-tier label with respect to the second location of the second-tier label based on the known dimensions of the second-tier label and the third-tier label and the depiction of the second-tier label and the third-tier label in the second image;
   determining a third location of the third-tier label based on the second relative position with respect to the second location and the second location; and
   adding a third block to a third blockchain associated with the third-tier label, wherein the third block includes the third location and a reference to the second block.

6. The method of claim 3, further comprising:
   obtaining a third image that depicts the first-tier label and the second-tier label;
   determining a third relative position of the second-tier label with respect to the first location of the first-tier label based on the known dimensions of first-tier label and the second-tier label and the depiction of the first-tier label and the second-tier label in the third image; and
   determining that the third relative position is different than the first relative position.

7. The method of claim 6, further comprising:
   determining a fourth location of the second-tier label based on the third relative position with respect to the second location and the second location; and adding a fourth block to the second blockchain associated with the second-tier label, wherein the fourth block includes the fourth location and a reference to the first block.

8. The method of claim 1, wherein the three orthogonal planar surfaces correspond with the two walls of the enclosure and a floor of the enclosure.

9. The method of claim 8, wherein the fixture is affixed to the floor of the enclosure.

10. A device for locating an item in an enclosure, comprising:
a processor;
memory in electronic communication with the processor; and
instructions stored in the memory that when executed by the processor cause the processor to:
obtain a first image that depicts a first-tier label and a second-tier label;
identify the first-tier label in the first image, wherein the first-tier label is affixed to a fixture within the enclosure, wherein the enclosure is associated with three orthogonal planar surfaces, and wherein the first-tier label has a first size;
determine a first location of the first-tier label based on at least three distance measurements between the first-tier label and a respective plane of the three orthogonal planar surfaces;
identify the second-tier label in the first image, wherein the second-tier label is in proximity to the first-tier label, wherein the second-tier label is associated with the item, and wherein the second-tier label has a second size;
determine a first relative position of the second-tier label with respect to the first location of the first-tier label based on the first image, wherein the first relative position is determined based on the first size of the first-tier label, the second size of the second-tier label, and the depiction of the first-tier label and the second-tier label in the first image; and
determine a second location of the second-tier label based on the first relative position with respect to the first location and the first location.

11. The device of claim 10, wherein the first size and the second size are of known dimensions so that the first relative position may be determined based on a special relationship between the first-tier label and the second-tier label depicted in the first image and scale provided by the first size and the second size.

12. The device of claim 11, wherein the instructions are further executable by the processor to:
add a first block to a first blockchain associated with the first-tier label, wherein the first block includes the first location; and
add a second block to a second blockchain associated with the second-tier label, wherein the second block includes the second location and a reference to the first block.

13. The device of claim 12, wherein the instructions are further executable by the processor to:
receive a request to locate the second item;
identify the second block in the second blockchain, wherein the second block includes the second location; and
provide the second location in response to the request.

14. The device of claim 12, wherein the instructions are further executable by the processor to:
obtain a second image that depicts the second-tier label and a third-tier label, wherein the third-tier label is associated with a third item;
determine a second relative position of the third-tier label with respect to the second location of the second-tier label based on the known dimensions of the second-tier label and the third-tier label and the depiction of the second-tier label and the third-tier label in the second image;
determine a third location of the third-tier label based on the second relative position with respect to the second location and the second location; and
add a third block to a third blockchain associated with the third-tier label, wherein the third block includes the third location and a reference to the second block.

15. The device of claim 12, wherein the instructions are further executable by the processor to:
obtain a third image that depicts the first-tier label and the second-tier label;
determine a third relative position of the second-tier label with respect to the first location of the first-tier label based on the known dimensions of first-tier label and the second-tier label and the depiction of the first-tier label and the second-tier label in the third image; and
determine that the third relative position is different than the first relative position.

16. The device of claim 15, wherein the instructions are further executable by the processor to:
determine a fourth location of the second-tier label based on the third relative position with respect to the second location and the second location; and
add a fourth block to the second blockchain associated with the second-tier label, wherein the fourth block includes the fourth location and a reference to the first block.

17. The device of claim 10, wherein the three orthogonal planar surfaces correspond with the two walls of the enclosure and a floor of the enclosure.

18. The device of claim 17, wherein the fixture is affixed to the floor of the enclosure.

* * * * *